Sept. 19, 1939.  O. D. LITTLEJOHN  2,173,397
PROPELLER
Original Filed April 14, 1935   5 Sheets-Sheet 1
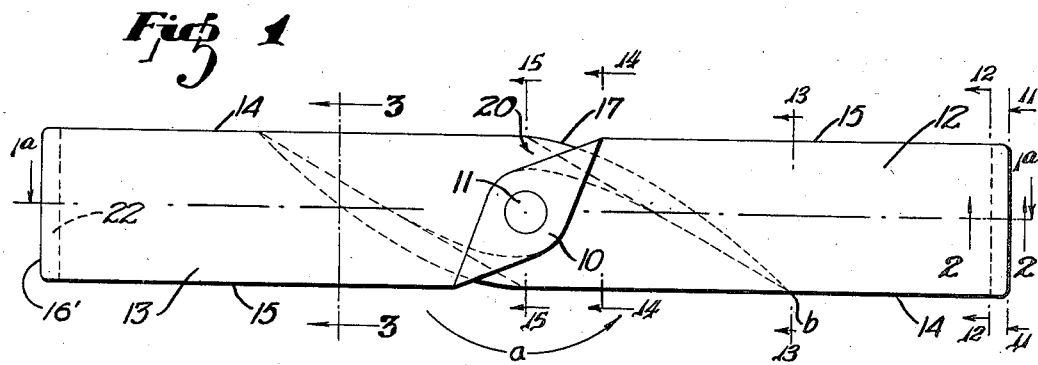
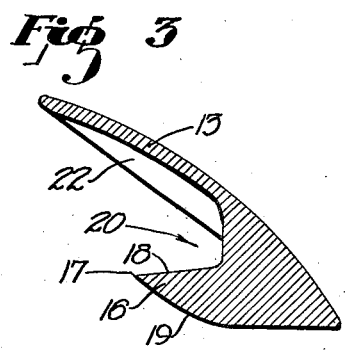
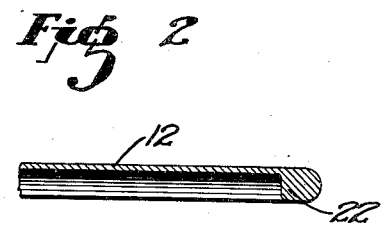
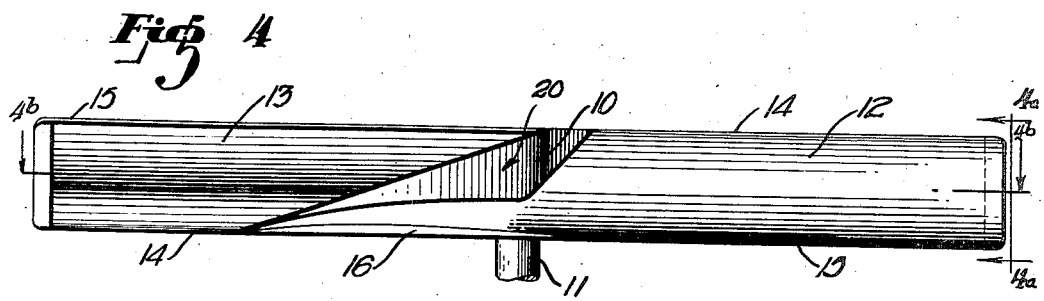
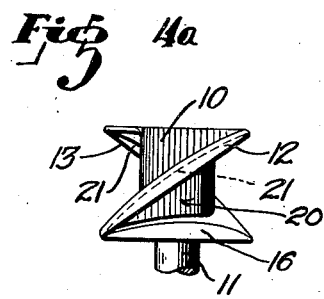
INVENTOR
ORVILLE D. LITTLEJOHN
BY
James M. Abbett
ATTORNEY

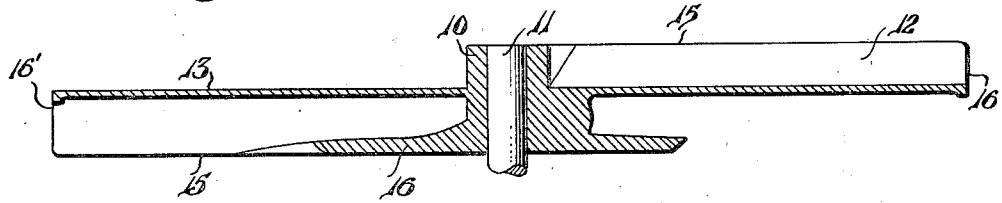
Fig. 1ᵃ
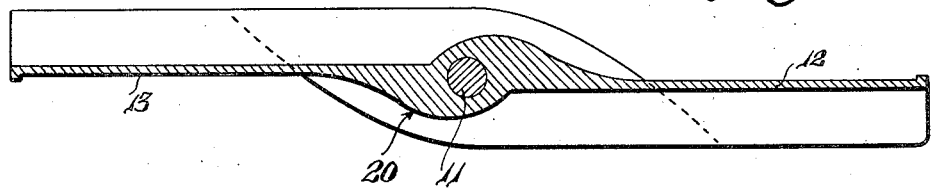
Fig. 4ᵇ
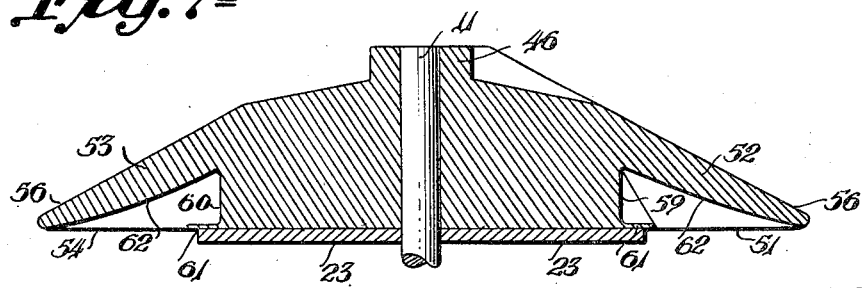
Fig. 7ᵇ
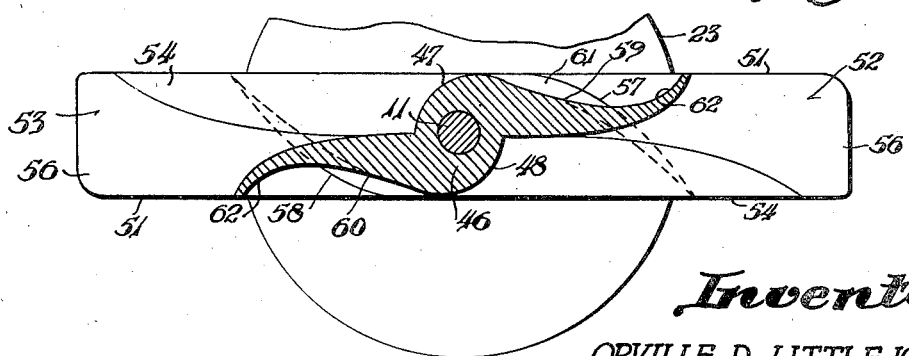
Fig. 8ᵃ
Inventor
ORVILLE D. LITTLEJOHN
by James M. Abbett
Atty

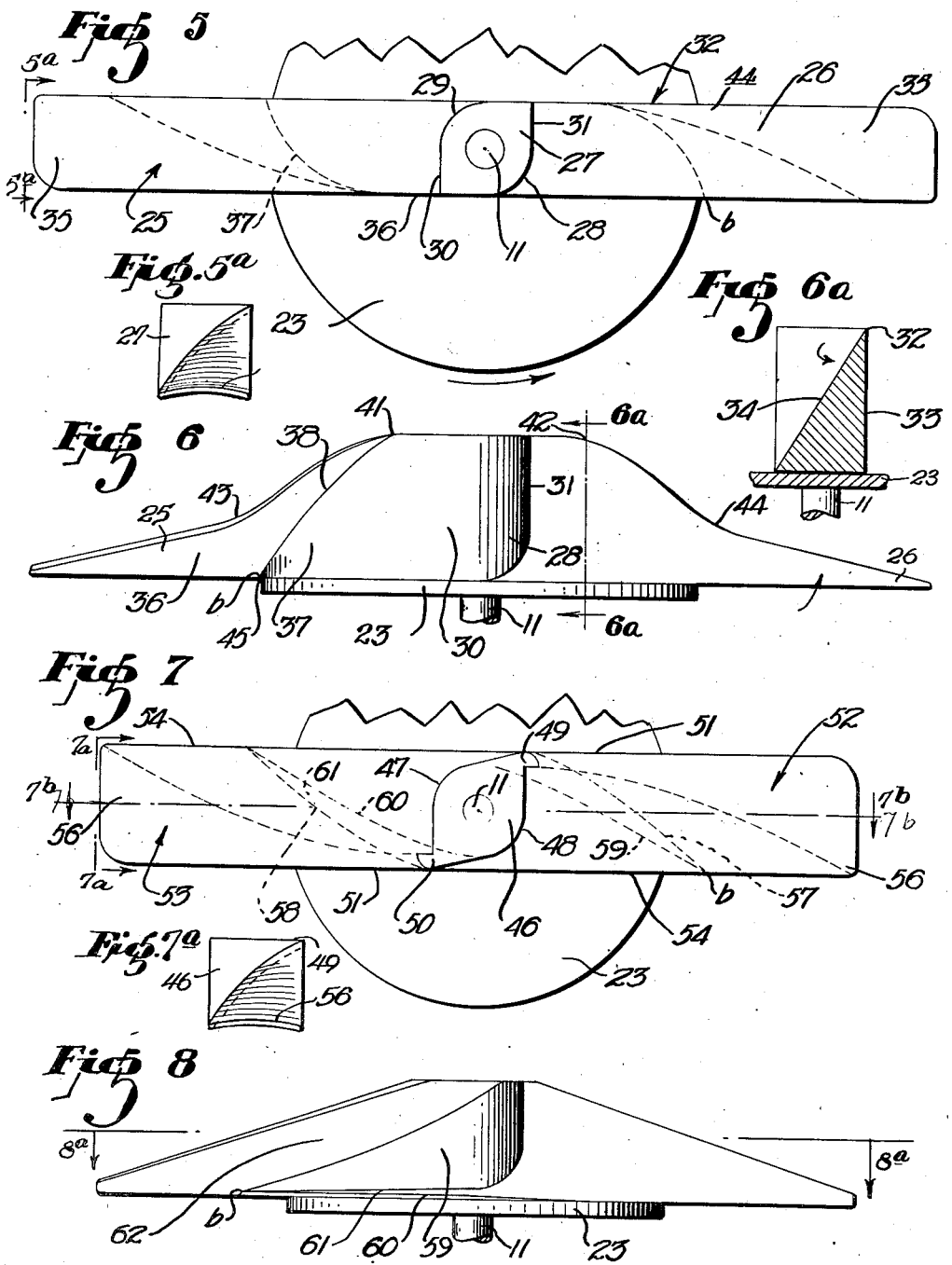

Sept. 19, 1939.          O. D. LITTLEJOHN          2,173,397
                              PROPELLER
              Original Filed April 14, 1935    5 Sheets-Sheet 4

INVENTOR
ORVILLE D. LITTLEJOHN
BY
James M. Abbett
ATTORNEY

Sept. 19, 1939.  O. D. LITTLEJOHN  2,173,397
PROPELLER
Original Filed April 14, 1935  5 Sheets—Sheet 5

Inventor
ORVILLE D. LITTLEJOHN
by James M. Abbett
Atty

Patented Sept. 19, 1939

2,173,397

UNITED STATES PATENT OFFICE 2,173,397

PROPELLER

Orville D. Littlejohn, Los Angeles, Calif.

Substitute for application Serial No. 74,298, April 14, 1935. This application September 1, 1937, Serial No. 162,007

11 Claims. (Cl. 170—159)

This invention relates to fluid propulsion means and particularly pertains to a propeller.

It is the principal object of the present invention to provide a type of propeller which is particularly adapted for use on airplanes, ventilating apparatus, and other types of apparatus where fluids are moved, and which propeller due to its novel design will insure that a relatively large volume of fluid may be moved by it by the exertion of a relatively small amount of driving power, and which further insures that due to its novel design the blades of the propeller may be relatively short and of small dimensions as compared to propellers now used in connection with the class of apparatus with which the present invention is concerned.

The present invention contemplates the provision of a propeller having a plurality of blades and which embodies the functions of an airfoil propeller, as well as a turbine type of propeller structure, whereby the combined action of the two will cooperate in moving fluids by which the propeller is surrounded.

The invention is illustrated by way of example in the accompanying drawings in which:

Figure 1 is a view in front elevation showing one form of the present invention.

Fig. 2 is a fragmentary view in section showing the form of the end of the blade tip as seen on the line 2—2 of Fig. 1.

Fig. 3 is a view in transverse section through the blade structure as seen on the line 3—3 of Fig. 1, and with the transverse end rib appearing in elevation.

Fig. 4 is a view showing the type of propeller disclosed in Fig. 1 in an edgewise position to more clearly disclose the blade construction.

Fig. 4a is a view of the propeller of Fig. 4 as seen on the line 4a—4a.

Fig. 5 is a view in elevation showing a form of the present invention particularly adapted for use in airplane work with low speed engines.

Fig. 6 is a view showing the propeller of Fig. 5 in an edgewise position.

Fig. 6a is a view of the propeller of Fig. 6 as seen on the line 6a—6a.

Fig. 7 is a view in front elevation showing a form of air plane propeller as particularly adapted for high speed engine use.

Fig. 8 is a view showing the propeller of Fig. 7 as viewed in an edgewise position.

Fig. 1A is a view in longitudinal section through the propeller as seen on line 1A—1A as indicated in the direction of the arrows of Fig. 1 of the drawings.

Fig. 4B is a view in longitudinal sections through the propeller as indicated on line 4B—4B in the direction of the arrows of Fig. 4.

Fig. 5A is a view in end elevation as indicated on line 5A—5A in the direction of the arrows of Fig. 5 of the drawings.

Fig. 7A is a view in end elevation as indicated in line 7A—7A of Fig. 7 in the direction of the arrows.

Fig. 7B is a view in longitudinal section through the form of the propeller as shown in Fig. 7 of the drawings.

Fig. 8A is a view in section of the propeller as seen on line 8A—8A of Fig. 8 and in the direction of the arrows.

Figure 9:
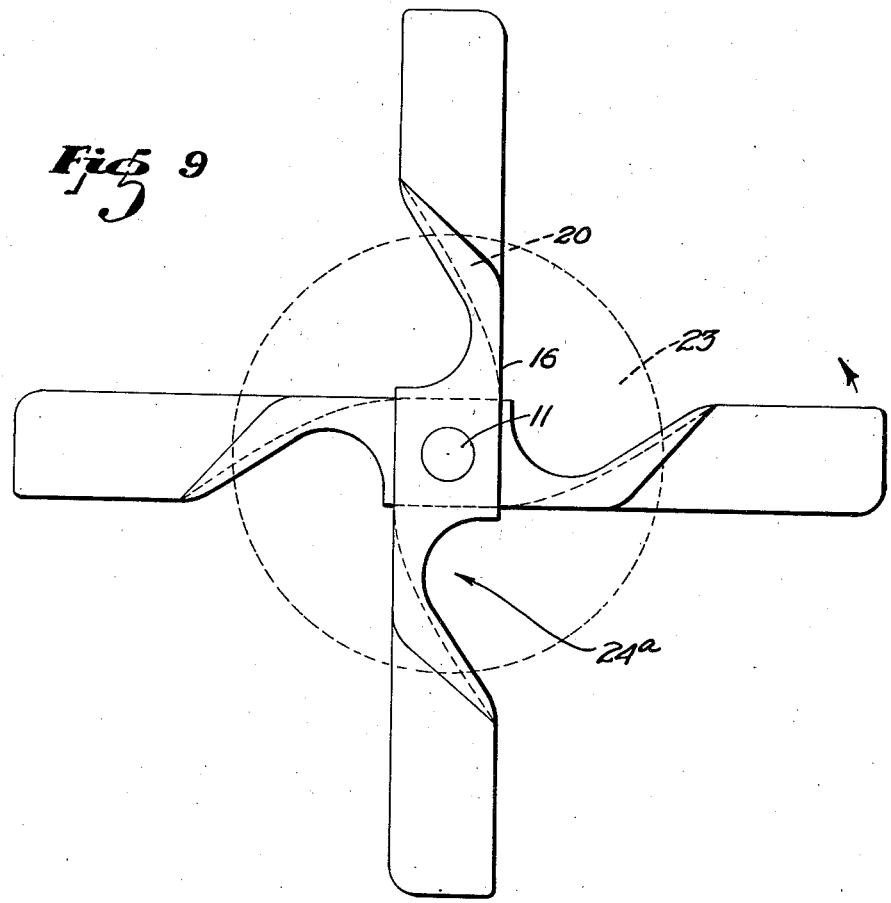
Fig. 9 is a view in elevation showing a propeller particularly adapted for ventilation work.

Referring to the form of the invention shown in Figs. 1 to 4 of the drawings, it will be seen that a double blade propeller is provided having a central hub portion 10 to receive a propeller shaft 11 and oppositely from which blades 12 and 13 extend. These blades extend in diametrically opposite directions from the hub 10 and are formed with straight opposite side edges 14 and 15 and a square end face 16'. The leading edge 15 of blade 13 and the trailing edge 14 of the blade 12 are in the same plane as shown in Fig. 4 of the drawings, and likewise the leading edge 15 of the blade 12 is in the same plane with the trailing edge 14 of the blade 13. Thus it will be seen that the blades are oppositely warped to be disposed at a desired opposite inclination to each other and opposite pitch. This is clearly shown in Fig. 4a where it will be seen that the blades 12 and 13 extend oppositely from the hub 10, and it will also be noted that each of the blades is formed with a lip 16 as shown in Fig. 4 which continues from the trailing edge 14 of one blade and to a point beyond the hub 10 and along the trailing edge 14 of the opposite blade. This lip gradually decreases in thickness toward its outer end and as shown in Fig. 3 of the drawings is formed with a relatively sharp edge 17 and inner and outer tapered faces 18 and 19 are coincident with the edge 17 at their point of juncture with the trailing edge 14 of a blade. Due to this arrangement a trough 20 occurs between the pressure face 21 of a blade and a lip 16. As shown in Fig. 3 of the drawings this trough is of greatest width at the hub 10 and converges to the point of juncture with the edge 17 of the lip 16. This produces a passageway through which air may be forced from the displacement face of one blade around the hub and against the pressure face of another blade. Attention is also directed to the fact that the pressure side of the blades 12 and 13 are transversely concaved in section and that they terminate in a transversely extending rib 22 which is particularly shown in Fig. 2 of the drawings.

It is to be understood that the propeller as here shown moves counter-clockwise in a direction indicated by the arrow a in Fig. 1. When the propeller is driven in the direction indicated the air is pumped from the area in advance of the hub, and from the displacement side of the opposite blade near the hub and driven by centrifugal action to the ends of the troughs 20 as designated at b. At the same time the air thus pumped will be compressed or squeezed in the gradually converging throat of the trough 20 and between the inner face 18 of the flange 16 and the adjacent pressure face 21 of the blade. This air will thus be forced out of the restricted opening of the trough 20 at b in a violent blast. At the same time the air thus forced radially blasts off at the point b from the channel but with this blast an increased pressure is built up along a section of the pressure side of the blade from the hub throughout the length of the trough 20. All of the air picked up in this area blasts off of the blade at point b. The air in advance of the leading edge of the blade is scooped up, and before the air can escape from the advancing blade a violent pressure is created so that the radially moving stream of air from along the trough 20 and the laterally moving stream of air from along the entering face of the blade will strike with considerable violence and will be directed in a line substantially parallel to the rotating axis of the propeller. This action is materially increased over that obtained by a propeller of the airfoil type alone, or a propeller having centrifugal vanes and passageways. The air will thus be forced from the pressure side of the propeller with great violence, and will at the same time create a suction due to the displacement of air on the suction side of the propeller to accelerate the movement of a large volume of air through the propeller.

In this particular type of propeller attention is directed to the fact that a novel action is obtained by placing the rib 22 across the end of the propeller blades. This is to retard the longitudinal movement of the air from the ends of the propeller. These ribs also insure that the air pressure will be increased from the entering edge of the blade to the trailing edge. The flange 16 which is represented by the edge 17 and the face 18 acts to retain the air which is moving along the trough 20 so that it will not be released until it reaches the point b. It has also been found that the presence of the transverse rib 22 materially decreases the noise produced incident to the operation of the propeller or fan.

The volute curved shape of the bottom of the trough 20 insures that the air will be gradually and positively drawn from around the hub 10 and will move outwardly to encounter the air being forced rearwardly by the main body of the propeller blades. In this connection it will be seen that each propeller blade of the type shown in Figs. 1 to 4, inclusive, comprises two sections, the section represented by the trough 20 bound on opposite sides by the flange 16, and the adjacent surface of a blade, and a second section which represents the blade portion having pressure surface 21 emerging from the bottom of the trough 20 and gradually increasing in width to a point where a longitudinally extending blade portion continues forwardly beyond the end of the flange 16.

Figure 10:
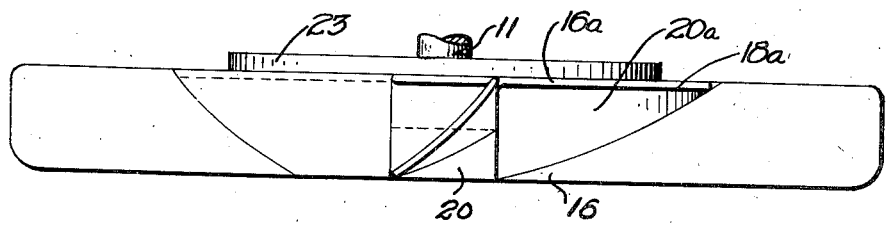
Fig. 10 is a view of the propeller of Fig. 9, as seen in an edgewise position.
Figure 11:
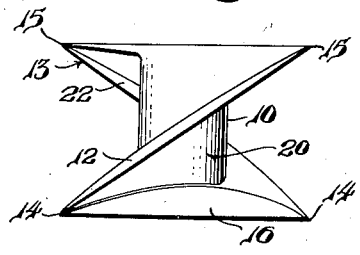
Fig. 11 is an end view of the form of a propeller shown in Fig. 1, as viewed in the direction of the line 11—11 of Fig. 1.
Figure 12:
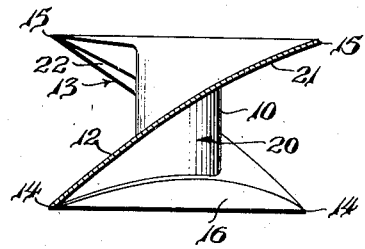
Fig. 12 is a view in transverse section and elevation as seen on the line 12—12 of Fig. 1.
Figure 13:
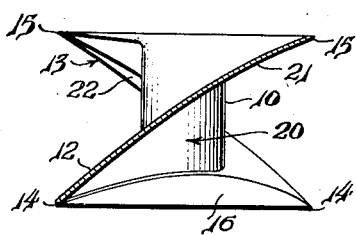
Fig. 13 is a view in transverse section and elevation as seen on the line 13—13 of Fig. 1.
Figure 14:
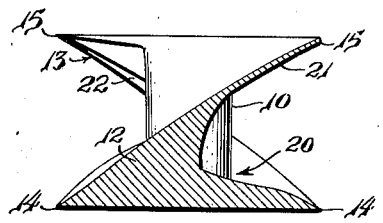
Fig. 14 is a view in transverse section and elevation as seen on the line 14—14 of Fig. 1.
Figure 15:
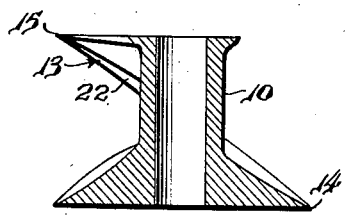
Fig. 15 is a view in transverse section through the hub of the propeller as seen on the line 15—15 of Fig. 1.

The particular type of propeller shown in Figs. 1 to 4, inclusive, is for circulation fans and air duct work where a free delivery of air is desirable. It has also been found that the distance from the point b to the axis of the propeller is substantially one-half of the radius of the propeller. In some instances it may be desirable to use a propeller of the foregoing type as shown in Figs. 9 and 10. In this particular type of propeller the construction and action is quite similar to that of the type of propeller shown in Figs. 1 to 4, inclusive. However, the trough portion 20a which agrees with the trough portion 20 of the type of propeller shown in Figs. 1 to 4 is much flatter and the flange 16a has a substantially flat inner edge 18a forming the confining wall of the trough 20a on the pressure side of the device. The outer ends of the blades are curved and dished out at 24 in order to decrease weight in the device the portion back of the troughs 20a are cut away as indicated at 24a, in Fig. 9 of the drawings.

The design and action of the propeller structure as shown in Figs. 9 and 10, however, is substantially the same as that of the propeller shown in Figs. 1 to 4 inclusive, since both types of propellers are based upon the same fundamental theory, that being of having a turbine or pump section operating adjacent the rotary axis of the propeller, and a blade section cooperating in the zone exterior thereof. In fact, it has been found in some instances the portion of the blade length beyond the pump section is eliminated and an effective fan action is still produced, since the air is forced tangentially and forwardly through the troughs 20a and between the blade face and the face of the flanges 16a. In connection with such a type of fan it has been found that the disc 23 shown in Fig. 8 controls the intake or suction of the fan by closing or pocketing the turbine intake sections of the propeller. At the same time the disc 23 acts to prevent back-flow of air pressure through the entire center section of the propeller. This disc is mounted on the pressure side of the blade and its diameter may vary for propellers to be used in different types of work. For example, for low pressure work the disc is relatively small and is increased in diameter for high pressure work or resistance. It is desirable, however, that the diameter of the disc shall in no instance be greater than one-half of the diameter of the propeller upon which it is used. In uses of the types of fans of the character shown in Figs. 5 to 10 it has been found that the presence of the disc on the fan where air is being delivered under high pressure or resistance, increases the efficiency of the fan many times over that obtained by most present types of ventilating fans, and when the same amount of power is consumed.

Referring particularly to Figs. 5 to 8 of the drawings, it will be seen that two types of propellers are shown which are especially adapted for airplane work. The propeller shown in Figs. 5 and 6 comprises blades 25 and 26 which extend oppositely from diametrically opposite sides of the propeller shaft 11. This type of propeller is intended to be used on present day airplane engines, and is formed with a central hub 57 shown in Fig. 5 as having a flat end portion bound by arcuate edges 28 and 29, and tangent edges 30 and 31. The thickness of the propellers at its hub is greater than any present day propellers and merges into a triangular base section of the propeller blades, as shown in section view 6a. It will thus be seen that the entering edge 32 is formed at the point where Fig. 6a was taken by the intersection of a relatively flat back face 33 and an inclined displacement face 34. The blade continues outwardly and is warped to form an airfoil tip 35 which represents the width of the blade. On the suction side of the blades the entering edge 32 merges the foil above the turbine into the warped face of the blade tips 35 and on the pressure side a face 36 occurs which is tangent to the arcuate edges 28 and 29 of the hub. This face continues beneath the pressure side of the blade ending at point b as in Figs. 1 to 4 to form a curved portion 37, which intersects with the warped pressure face of the blade along the line 38 indicated in Fig. 6.

Mounted upon the pressure side of the propeller of the type shown in Fig. 6 is a disc 23 which represents substantially one-half of the diameter of the entire propeller, or size that is needed; but should not exceed the one-half of the total diameter. It will be seen that in the type of device an air trough will occur on the pressure side of the blades and along the surfaces 38 beneath the warped portions of the pressure side of the blade adjacent to the channel 38. This air trough has the same function as the trough 20 previously described in reference to other figures of the drawings, and the cooperation of the extended surfaces 36 and 37 will produce the same pumping action.

In the form of the drawing shown in Figs. 5 and 6 it is desirable that the driving speed be up to and including 2000 R. P. M. and when thus operated the surfaces 37 will act to force the air radially off the propeller while moving it into a position to encounter the under inclined pressure side of the blade. The air thus forced radially will then encounter the air pressure developed under the pressure side of the blade along surfaces 36 and 37 and the propulsion of the airplane will take place. It is to be understood that the action of the displacement side of the blade is similar to airfoil action in present types of propellers as shown at 26 in Fig. 5. The disc 23 may be of a desired diameter, preferably being designed in direct relation to the speed at which the propeller is to be moved, never over one-half total diameter of propeller.

The pumping action of the propeller removes most of the air occurring in the zone from points 41 and 42 of the suction face of the propeller. This causes air displacements which creates suction in advance of the propeller. Suction is also created in advance of the points 32 and 44 along the entering edges of the blades and will act to compress and drive rearwardly air from points 45 on the pressure side of the blade and around the disc. The suction created on the displacement side of the blade between the points 43 and 45 tends to draw the air along the front of the propeller to follow with the blasted air driven off the end of the turbine at point b in the same turbine action as previously described. This action also increases the thrust. The thrust is created by the propeller due to the fact that the propeller rapidly moves into the displaced area. This particular type of propeller operates more efficiently at relatively low speeds. Due to the fact that the action of the airfoil between points 43 and 45 and to the blade tips produce a fast slicing and splitting of air in front of the propeller and in the direction of travel, the airfoil blades do not permit a high R. P. M. of the propeller without causing the efficiency to fall rapidly. This is partially compensated for by the use of the center disc 23 and the turbine sections in connection therewith.

In the form of the invention shown in Figs. 7 and 8, a type of propeller is disclosed which is designed for use with high speed engines. This propeller, however, from its suction side is formed with a hub 46 which has concentric arcuate faces 47 and 48. These faces extend parallel to the rotating axis of the propeller. At diametrically opposite sides of the hub portions 49 and 50 occur from which the leading edges 51 of propeller blades 52 and 53 extend. These leading edges are parallel to the trailing edge 54 of the propeller blades and upon opposite sides of the hub are continuations thereof. The propeller blades are warped from the portions 49 and 50 to the corners of the blade tips 56 and their outer ends may be disposed substantially in the same transverse plane parallel to the back face of the propeller or at desired other angles thereto. Mounted on the back face of the propeller is a disc 23 as previously described. The back face of the hub portion of the propeller is of greater dimensions than the front face of the hub portion and is defined by the dotted lines 57 and 58, as shown in Fig. 7 of the drawing, the hubs having continuing volute faces 59 and 60 which cause flanges 61 to occur adjacent the back face and to cooperate with the warped faces 62 and the faces 59 and 60 to form a trough similar to that previously described in other forms of the invention. The action of this propeller is basically the same as the other propellers here shown and described.

It will be understood that the forms of propellers here shown and described may be made in different designs and may be adapted for any purpose where it is desirable to move a fluid. In all cases the propeller will embody the use of a central section by which the air is moved radially and outer sections by which a laterally moving stream of air will encounter the radially moving stream of air to produce the results here obtained.

When other types of propellers on the market get their driving power or thrust with the typical airfoil sections known today, this high speed type as shown in Figs. 7 and 8 departs almost entirely from the present known designs. When the thrust in the present types is created directly in front of each propeller blade this type, turning at high revolutions, creates in itself a circular area in which the propeller revolves. I have eliminated the air foil propeller known today and instead made the scope of the area of the circle in which the propeller revolves a complete so-called airfoil over the entire area of the circle. It is provided that in air types the higher the R. P. M. the greater percentage of total work is accomplished at the center of the propeller.

It will thus be seen that the propeller here disclosed embodies principles making it generally adaptable for all classes of work and that the action of the propeller insures that the efficient movement of fluids will take place with a minimum expenditure of horsepower.

While I have shown the preferred form of my invention, as now known to me, it will be understood that various changes might be made in the combination, construction and arrangement of parts, by those skilled in the art, without departing from the spirit of the invention as claimed.

Having thus described my invention, what I claim and desire to secure by Letters Patent is:

1. A propeller comprising a hub section having volute faces extending from diametrically opposite sides of the hub and partially around the hub, and propeller blades extending radially from diametrically opposite sides of the hub, the bases of which blades are intersected by said volute faces.

2. A propeller comprising a hub section having volute faces extending from diametrically opposite sides of the hub and partially around the hub, and propeller blades extending radially from diametrically opposite sides of the hub, the bases of which blades are intersected by said volute faces, whereby a relatively straight face extending parallel to the rotating axis of the propeller will occur along said volute surface and will gradually decrease in area from the displacement side of the propeller to the pressure side.

3. A propeller comprising a hub section having volute faces extending from diametrically opposite sides of the hub and partially around the hub, propeller blades extending radially from diametrically opposite sides of the hub, the bases of which blades are intersected by said volute faces, whereby a plane face extending parallel to the rotating axis of the propeller will occur along said volute surface and will gradually decrease in area from the displacement side of the propeller to the pressure side, and a flange extending along the pressure edge of the volute face whereby the volute face will form the bottom of an air trough decreasing in area from the displacement side of the hub to a relatively narrow trough on the pressure side of the hub.

4. A propeller comprising a hub section having volute faces extending from diametrically opposite sides of the hub and partially around the hub, propeller blades extending radially from diametrically opposite sides of the hub, the bases of which blades are intersected by said volute faces, whereby a plane face extending parallel to the rotating axis of the propeller will occur along said volute surface and will gradually decrease in area from the displacement side of the propeller to the pressure side, and a flange extending along the pressure edge of the volute face whereby the volute face will form the bottom of an air trough decreasing in area from the displacement side of the hub to a relatively narrow trough on the pressure side of the hub, said blade sections being warped from the line of intersection with the volute surface of the propeller to their tips.

5. A propeller comprising a hub section having volute faces extending from diametrically opposite sides of the hub and partially around the hub, propeller blades extending radially from diametrically opposite sides of the hub, the bases of which blades are intersected by said volute faces, whereby a plane face extending parallel to the rotating axis of the propeller will occur along said volute surface and will gradually decrease in area from the displacement side of the propeller to the pressure side, a flange extending along the pressure edge of the volute face whereby the volute face will form the bottom of an air trough decreasing in area from the displacement side of the hub to a relatively narrow trough on the pressure side of the hub, said blade sections being warped from the line of intersection with the volute surface of the propeller to their tips, and a solid disc mounted on the pressure side of the propeller and being of a diameter substantially equal to the diametrical portion of the propeller as represented by the volute sections thereof.

6. A propeller having a relatively long hub as compared with the diameter of the propeller, the pressure face of said propeller being in substantially the same plane as the pressure end of the hub, volute faces extending partially around the hub from one side to the other, said volute faces being upon diametrically opposite sides of the hub, the surface of said faces being parallel to the longitudinal axis of the propeller, blades extending oppositely from said hub, the trailing edge lying substantially in the plane of the pressure face of the hub and the entering edge extending from a point adjacent the displacement face of the hub, said blades being warped and intersecting the volute faces of the hub to progressively shorten the volute faces from the displacement side of the hub to the pressure side, at which point the volute face will terminate adjacent to the trailing edge of a blade and at a point substantially midway from the rotary axis of the propeller to the tip of the blade.

7. A propeller having a relatively long hub as compared with the diameter of the propeller, the pressure face of said propeller being in substantially the same plane as the pressure end of the hub, volute faces extending partially around the hub from one side to the other, said volute faces being upon diametrically opposite sides of the hub, the surface of said faces being parallel to the longitudinal axis of the propeller, blades extending oppositely from said hub, the trailing edge lying substantially in the plane of the pressure face of the hub and the entering edge extending from a point adjacent the displacement face of the hub, said blades being warped and intersecting the volute faces of the hub to progressively shorten the volute faces from the displacement side of the hub to the pressure side at which point the volute face will terminate adjacent to the trailing edge of a blade and at a point substantially midway from the rotary axis of the propeller to the tip of the blade, and a flange formed as a continuation of the trailing edge of one blade and extending along the pressure edge of the volute surface adjacent the opposite blade whereby an air trough will extend from around the hub in advance of the trailing edge of the first named blade to a point along the length of the trailing edge of the second named blade.

8. A propeller having a relatively long hub as compared with the diameter of the propeller, the pressure face of said propeller being in substantially the same plane as the presures end of the hub, volute faces extending partially around the hub from one side to the other, said volute faces being upon diametrically opposite sides of the hub, the surface of said faces being parallel to the longitudinal axis of the propeller, blades extending oppositely from said hub, the trailing edge lying substantially in the plane of the pressure face of the hub and the entering edge extending from a point adjacent the displacement face of the hub, said blades being warped and intersecting the volute faces of the hub to progressively shorten the volute faces from the displacement side of the hub to the pressure side at which point the volute face will terminate adjacent to the trailing edge of a blade and at a point substantially midway from the rotary axis of the propeller to the tip of the blade, and a flange formed as a continuation of the trailing edge of one blade and extending along the pressure edge of the volute surface adjacent the opposite blade whereby an air trough will extend from around the hub in advance of the trailing edge of the first named blade to a point along the length of the trailing edge of the second named blade, the edges of said blades being warped to form an airfoil.

9. A propeller comprising a hub section having volute faces extending from diametrically opposite sides of the hub portion, the transverse plane of said faces being parallel to the rotary axis of the propeller, the volute portions being of width equal to that of the hub and tapering from the displacement side of the hub to the pressure side, blades extending outwardly from the hub and the propeller being greater than one-half the diameter of the propeller.

10. A propeller comprising a hub section having volute faces extending from diametrically opposite sides of the hub portion, the transverse plane of said faces being parallel to the rotary axis of the propeller, the volute portions being of width equal to the length of the hub at the hub and tapering from the displacement side of the hub to the pressure side, blades extending outwardly from the hub and the volute portions the diameter of the volute portion of the propeller being greater than one-half the diameter of the propeller, and the opposite edges of the blades being straight and parallel and terminating in square end portions.

11. A propeller comprising a hub section having volute faces extending from diametrically opposite sides of the hub portion, the transverse plane of said faces being parallel to the rotary axis of the propeller, the volute portions being of width equal to the length of the hub at the hub and tapering from the displacement side of the hub to the pressure side, blades extending outwardly from the hub and the volute portions the diameter of the volute portion of the propeller being greater than one-half the diameter of the propeller, and the opposite edges of the blades being straight and parallel and terminating in square end portions, and a transverse rib formed across said end portions on the inner faces thereof.

ORVILLE D. LITTLEJOHN.